United States Patent [19]

Fischer et al.

[11] Patent Number: 4,950,716
[45] Date of Patent: Aug. 21, 1990

[54] COMPATIBLE POLYCARBONATE/METHYL-METH-ACRYLATE POLYMER MIXTURES

[75] Inventors: Jens-Dieter Fischer, Darmstadt; Winfried Wunderlich, Rossdorf; Werner Siol, Darmstadt-Eberstadt, all of Fed. Rep. of Germany

[73] Assignee: Rohm GmbH Chemische Fabrik, Darmstadt, Fed. Rep. of Germany

[21] Appl. No.: 334,769

[22] Filed: Apr. 10, 1989

Related U.S. Application Data

[63] Continuation of Ser. No. 155,545, Feb. 12, 1988, abandoned.

[30] Foreign Application Priority Data

Mar. 24, 1987 [DE] Fed. Rep. of Germany ....... 3709562

[51] Int. Cl.$^5$ .................. C08F 8/46; C08L 31/06; C08L 33/12; C08L 69/00
[52] U.S. Cl. .................................. 525/148
[58] Field of Search .......................... 525/148

[56] References Cited

U.S. PATENT DOCUMENTS

| | | | |
|---|---|---|---|
| 4,740,553 | 4/1988 | Maeda | 525/67 |
| 4,749,749 | 6/1988 | Munzer et al. | 525/148 |

FOREIGN PATENT DOCUMENTS

| | | |
|---|---|---|
| 0144231 | 6/1985 | European Pat. Off. . |
| 0173146 | 3/1986 | European Pat. Off. . |
| 2264268 | 7/1973 | Fed. Rep. of Germany . |
| 3518538 | 11/1986 | Fed. Rep. of Germany . |
| 1182807 | 3/1970 | United Kingdom . |

*Primary Examiner*—John C. Bleutge
*Assistant Examiner*—Susan Berman
*Attorney, Agent, or Firm*—Oblon, Spivak, McClelland, Maier & Neustadt

[57] ABSTRACT

This invention concerns transparent polymer mixtures that can be processed thermoplastically consisting of (A) polycarbonates, particularly Bisphenol A polycarbonates, and (B) copolymers of methyl methacrylate and 5 to 40 wt. % of N-substituted maleimides, with the substituent on the imide nitrogen being an optionally substituted cyclohexyl group, in which the copolymer (B) can also be made up of other $\alpha,\beta$-unsaturated monomer units in amounts of 0 to 40 wt. %.

8 Claims, No Drawings

COMPATIBLE POLYCARBONATE/METHYL-METH-ACRYLATE POLYMER MIXTURES

This application is a continuation of application Ser. No. 155,545, filed on Feb. 12, 1988, now abandoned.

BACKGROUND OF THE INVENTION

1. Field of the Invention:

The invention relates to polymer mixtures. It concerns especially those comprising an aromatic polycarbonate, particularly the polycarbonate of Bisphenol A, and a methyl methacrylate copolymer, which are distinguished by high transparency.

2. Discussion of the Background:

It is known how to mix aromatic polycarbonates, especially polycarbonates of Bisphenol A, with other polymers, to obtain combinations that may be multiphased or incompatible polymer mixtures, so-called polymer blends, or homogeneous, compatible polymer mixtures. Compatible polymer mixtures are also called polymer alloys.

Polymethyl methacrylate molding material, a glass-clear, transparent plastic, does not give homogeneous, transparent alloys with the polycarbonate of Bisphenol A, also a transparent plastic, but rather mixtures with pearly luster, as disclosed by Japanese Patent 72 16 063.

According to German 22 64 268, an improved polycarbonate molding material is obtained when an acrylic polymer of low molecular weight which is a copolymer consisting of 90 to 75 wt.% methyl methacrylate and 10 to 25 wt.% of an alkyl acrylate with the formula

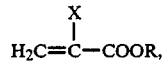

with X equal to H or CH$_3$ and R being an organic group with 4 to 12 carbon atoms, is added to the polycarbonate. The amount of copolymer additive can be 0.01 to approximately 50 wt.% of the weight of the polycarbonate composition. The melt viscosity of the polycarbonate or of the mixture is progressively reduced with increasing addition of copolymer, without impairing the transparency.

Therefore, these copolymers are polymeric plasticizers whose molecular weight must be below 15,000 to produce the compatibility described, on the basis of the present inventor's experiments with appropriate copolymers. To produce polymer alloys that have properties of industrial interest in the range of high polymethacrylate fractions, however, such copolymers are completely unsuitable because of the familiar degradation of the mechanical properties in the molecular weight range below 100,000, particularly below 50,000 (see Plastics Manual, Volume IX, Vieweg/Esser: Polymethacrylates, Pages 112 ff).

Compatible polymer mixtures that consist of a polycarbonate such as Bisphenol A polycarbonate and a copolymer of monomeric esters of acrylic and/or methacrylic acid with C$_1$–C$_{10}$ alcohols and a UV-absorbing monomer of the formula

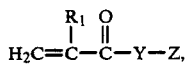

in which R$_1$ stands for hydrogen or a methyl group and Y stands for oxygen or an NR2 group with R2 standing for hydrogen or alkyl group, and Z stands for a UV-absorbing group, namely a 2-hydroxybenzotriazole group, a 2-hydroxybenzophenone or acetophenone group, or an α-cyano-β,β-diphenyl group, are described in German Application P 35 18 538.4.

Such polymer mixtures of polycarbonate and copolymers of methyl methacrylate and monomers with pronounced absorbing power for ultraviolet radiation, which can also be processed as thermoplastics and that are used as optical filters to improve the resistance to light of plastics, for example, especially as coatings, are polymer mixtures with only very special uses and are prohibitively expensive for widely usable compositions that can be processed as thermoplastics because of the high cost of the UV absorber incorporated in them. German Application P 36 32 946.0, describes methyl methacrylate copolymers with methacrylamides as co-monomers that are substituted on the amide nitrogen with a cyclic organic group that also has no pronounced UV-absorbing power, which can be processed as thermoplastics. These copolymers form transparent polymer mixtures with polycarbonates, especially Bisphenol A polycarbonate, which can be processed as thermoplastics.

Thermoplastic molding materials such as polymer mixtures of a polycarbonate, a copolymer consisting of styrene, methyl methacrylate, and N-phenylmaleimide, and a graft polymer of methyl methacrylate on rubber, are not compatible according to European 173 146. Likewise, the polymer mixtures disclosed by European 144 231, consisting of a polycarbonate and a copolymer of methyl methacrylate/N-phenylmaleimide, and/or an EPDM-graft-methyl methacrylate/N-phenylmaleimide copolymer, are not fully compatible and are thus polymer blends.

A need continues to exist for compatible polymer mixtures that can be processed as molding materials and which are comprised of polycarbonate and a polymer that consists of high proportions of methyl methacrylate.

SUMMARY OF THE INVENTION

Accordingly, one object of the present invention is to provide compatible polymer mixtures comprised of polycarbonate and a polymer which consists of high proportions of methyl methacrylate.

Another object of this invention is thermoplastic molding materials that are compatible polymer mixtures of polycarbonates with polymers prepared by copolymerization of methyl methacrylate, N-cyclohexylmaleimide, or N-alkylcyclohexylmaleimides, and optionally other monomers, especially α-methylstyrene or other methacrylic or acrylic esters.

These and other objects of the invention which will become apparent from the following specification have been achieved by the present thermoplastic polymer mixture which comprises an aromatic polycarbonate and a methacrylate copolymer, wherein said copolymer comprises (i) 40–95 wt.% methyl methacrylate, and (ii) 5–40 wt.% maleimide monomer units having formula I

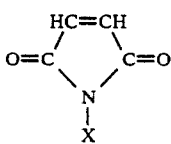

wherein X is an unsubstituted cyclohexyl group or a monosubstituted or polysubstituted cyclohexyl group substituted with at least one substituent selected from the group consisting of $C_{1-6}$ alkyl groups and a phenyl group, and wherein said copolymer has a molecular weight $M_w$ greater than 30,000.

DETAILED DESCRIPTION OF THE PREFERRED EMBODIMENTS

It has been found that glass-clear polymethacrylate resins with plastic properties and polycarbonates such as the polycarbonate of Bisphenol A, which in turn is a transparent plastic with impact resistance, surprisingly according to the criteria apparent for "compatible polymers" in Polymer Handbook, Second Edition, 1975, III, 211 to 213, can be alloyed into compatible and again glass-clear new plastics, when the polymethacrylate resins used are copolymers with high proportions, i.e. 95 to 40 wt.%, especially 95 to 50 wt .%, of methyl methacrylate and from 5 to 40 wt.% of an optionally alkyl- or aryl-substituted N-cyclohexylmaleimide. The copolymer can also contain other monomers, preferably α-methylstyrene and/or other methacrylic or acrylic compounds, especially their esters, in amounts of 0 to 40 wt.%, especially in amounts of 2.5 to 40 wt.%, and very particularly in amounts of 5 to 35 wt.%.

It is surprising that the incorporation of N-cyclohexylmaleimide in methyl methacrylate polymers, eliminates the drawback of incompatibility with polycarbonates in such polymer mixtures, in contrast to the corresponding N-phenylmaleimide copolymers known in the art.

The compatibility of polycarbonate and the polymethacrylate resin is accomplished according to the present invention by copolymerizing N-cyclohexylmaleimides of the general formula:

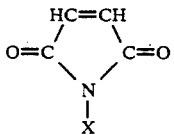

in which X is a cyclohexyl group or a monosubstituted or polysubstituted cyclohexyl group, with the substituents being alkyl groups with 1 to 6 carbon atoms or a phenyl group, as comonomers in polymethacrylate resin.

Examples of such maleimide comonomers are N-cyclohexylmaleimide, N-2-methylcyclohexylmaleimide or N-4-methylcyclohexylmaleimide, N-3,3,5-trimethylcyclohexylmaleimide, N-4-ethylcyclohexylmaleimide, N-2-t-butylcyclohexylmaleimide or N-4-t-butylcyclohexylmaleimide, and N-2-phenylcyclohexylmaleimide.

The polycarbonate (A) is preferably the reaction product of 2,2-bis(4-hydroxyphenyl)propane, known as Bisphenol A, and phosgene.

The copolymer (B) and the monomers of formula I copolymerized with it are distinguished from the copolymers described in German Application P 35 18 538.4 by the fact that they have no substantial absorption from the entire visible range into the UV range of 340 nm.

The polymethylmethacrylate resins which are compatible with polycarbonate, particularly with the polycarbonate of Bisphenol A, are substantially comprised of methyl methacrylate. The methacrylate polymer contains copolymerized cyclohexylmaleimide units of the structure indicated above in amounts of 5 to 40 wt.%. The copolymer can contain other units of α,β-unsaturated monomers such as styrene, α-methylstyrene, acrylic acid or methacrylic acid or their esters or their amides in amounts of 0 to 40 wt.%, especially in amounts of 2.5 to 40 wt.%, and very particularly in amounts of 5 to 35 wt.%. The amide derivatives may also be substituted on the amide nitrogen.

These α,β-unsaturated monomers have the formula

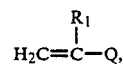

in which $R_1$ stands for H or $CH_3$, and Q stands for an aryl group, especially phenyl or substituted phenyl, or Q stands for

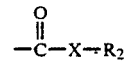

with X =O or $NR_3$, and $R_2$ and $R_3$ stand for H or alkyl with 1 to 14 carbons, or with 2 to 14 carbon atoms if $R_1 = CH_3$ and X =O, or cycloalkyl with 5 to 10 carbon atoms, or aryl with 6 to 10 carbon atoms.

These copolymers are prepared by known procedures for the polymerization of α,β-unsaturated compounds, especially radical polymerization, for example in bulk or in solution or as bead polymerization. Initiators used for radical polymerization can be azo compounds such as azodiisobutyronitrile, or peroxides such as dibenzoyl peroxide, dilauroyl peroxide, or redox systems, or the initiating radicals can be produced by radiation chemistry.

It is well known that the compatibility of polymers in mixtures depends on their degrees of polymerization. As a rule, the compatibility decreases with increasing molecular weight of the polymers, with the mixtures then consisting of two or more phases.

To prepare polycarbonate-polymethacrylate alloys pursuant to the invention, methyl methacrylate copolymers are used that have molecular weights ($M_w$, in grams per mole) above 30,000, from approximately 30,000 to 200,000, preferably approximately 50,000 to 100,000, and whose reduced viscosities $\eta_{spec/c}$, measured according to DIN 51 562 in chloroform are in the range of 18 to 65 ml/g, preferably in the range of 30 to 50 ml/g. The molecular weight of the copolymers is generally determined by gel permeation chromatography or by light scattering, for example. The copolymers with their molecular weights thus controlled are preferably prepared by polymerization in the presence of transfer regulators, such as the mercaptans known for this purpose. In this regard, see Houben-Weyl, Methoden der organischen Chemie, Volume XIV/1, 1961, Page 66. Thus, for example, methyl methacrylate copolymers with 6 to 15 wt.% of N-cyclohexylmaleimide and an $\eta_{spec/c}$ of 33 ml/g in chloroform as solvent are compatible over the entire range of alloys with Bisphenol A polycarbonate, for example Makrolon ®1189, which has an $\eta_{spec/c}$ of 43 ml/g in chloroform.

The polycarbonate-compatible methyl methacrylate copolymers pursuant to the invention can be processed thermoplastically to produce glass-clear, colorless molded objects which have Vicat softening points (VET), of approximately 120 to 150° C. measured according to DIN 53 460. Aromatic polycarbonates, especially polycarbonates of Bisphenol A, are used in particular as the polycarbonates compatible with the methyl methacrylate-maleimide (I) copolymers.

Polycarbonates of Bisphenol A are glass-clear, tough plastics, and are marketed under the name Makrolon ®, for example. The molecular weights of the polycarbonate polymers are in the range from approximately 20,000 to 40,000, and the Vicat softening points of these plastics are about 140° C., measured according to DIN 53 460.

Alloying the two types of plastic produces a transparent plastic system with different and more desirable properties than shown by the individual plastics before alloying. For example, the thermoplastic processing of poly-Bisphenol A carbonate, which has a high melt viscosity can be facilitated by alloying with thermoplastic polymethacrylate plastic without other properties of the polycarbonate being substantially changed. In contrast, substantial changes are known to occur by alloying low molecular weight acrylic polymers.

The thermal dimensional stabilities (VET according to DIN 53 460) and the glass transition temperatures (Tg) correlated with those (measured by the DSC method, see in this regard Polymer Handbook, 2nd Edition, II, Pages 139-141) of the polymethacrylate resins to be used pursuant to the invention, with values of approximately 130 to 155° C, are distinctly higher than those of ordinary, commercial polymethacrylate molding materials, whose values are approximately 100° C.

Alloys of the present invention surprisingly show high-temperature dimensional stabilities over the entire range of mixtures, or over a broad range of mixtures, that are only a few temperature degrees lower than those of the individual plastics. In particular, the high-temperature stable polycarbonate of Bisphenol A that has temperature stability which is distinctly higher than that of polymethyl methacrylate.

Mixtures of the polymer components A and B can be processed into a very wide variety of molded items for example as pellets, by extrusion or injection molding. Examples that may be mentioned are plates, hollow-chamber plates, molded items for optical purposes such as lenses or prisms, or optical waveguides or reflectors, and optically readable data carriers. The polymeric materials commonly used for the production of these items, such as Bisphenol A polycarbonate or polymethyl methacrylate, cause problems relative to optical birefringence or water absorption. Films or molded items of the polymer mixtures pursuant to the invention can also be made by casting solutions containing the polymer components A and B.

Other features of the invention will become apparent in the course of the following descriptions of exemplary embodiments which are given for illustration of the invention and are not intended to be limiting thereof.

EXAMPLES

A. Examples 1-6: Preparation of Copolymers

Example 1

10 parts by weight of N-cyclohexylmaleimide (CHMI) was dissolved in 90 parts by weight of methyl methacrylate (MMA) with gentle heating. 0.2 parts by weight of dilauroyl peroxide and 0.05 parts by weight of 2,2-bis(t-butylperoxy)butane were then added as initiators, and 1.3 parts by weight of dodecyl mercaptan was added with stirring as a molecular weight regulator. This solution was polymerized in a water bath in a film tube for 16 h at 52° C and for 10 h at 58° C., and was tempered for 10 h at 120° C in a drying oven for the final polymerization. The copolymer thus obtained and used for the preparation of polymer mixtures according to Examples 32-36 was clear and a light yellow in color. The average molecular weight (Mw) was found to be 90,000 and the VET value was 119° C.

Example 2

20 parts by weight of CHMI and 20 parts by weight of alpha-methylstyrene (α-MS) were first dissolved in 60 parts by weight of MMA with gentle heating. The initiators t-butyl perpivalate (0.4 parts by weight, low-temperature initiator), dilauroyl peroxide (0.17 parts by weight, medium-temperature initiator), and 2,2-bis(t-butyl-peroxy)butane (0.05 parts by weight, high-temperature initiator), and 0.55 parts by weight of dodecyl mercaptan (molecular weight regulator) were then added in addition. This solution was polymerized in a water bath in a film tube for 24 h at 53° C. and 24 h at 60° C., and was tempered at 125° C. in a drying oven for 10 h for the final polymerization. The copolymer used for the preparation of polymer mixtures according to Examples 7-11 had a light yellow color and slight turbidity. The average molecular weight was 72,000.

Example 3

A solution of 80 parts by weight of MMA, 10 parts by weight of CHMI, and 10 parts by weight of α-MS were polymerized according to Example 2, with the polymerization time being 46 h with a water bath temperature of 60° C. The average molecular weight was found to be Mw =87,000. The polymer was slightly yellowish and clear.

Example 4

60 parts by weight of MMA were copolymerized with 30 parts by weight of CHMI and 10 parts by weight of α-MS, again according to Example 2, with the amount of molecular weight regulator being reduced to 0.4 parts by weight and with the polymerization time being 22 h with a water bath temperature of 60° C. The average molecular weight of the light yellowish and clear polymer obtained was 85,000.

Examples 5 and 6

Solutions of 58 parts by weight of MMA, 20 parts by weight of CHMI, 20 parts by weight of α-MS, and 2 parts by weight of methyl acrylate (MA) or cyclohexyl acrylate (CHA) were polymerized according to Example 2, with the polymerization times in the water bath at 60° C. being 46 h in the case of the copolymer containing MA, and 70 h for the copolymer containing CHA. The polymers were slightly cloudy and yellowish. Molecular weights and VET's:

Copolymer containing MA: Mw=86,000; VET=139° C.

Copolymer containing CHA: Mw=82,000; VET=137° C.

B. Examples 7-36: Mixtures According to the Invention

Examples 7-11

Makrolon® 1189 and the copolymer prepared according to Example 2 were mixed together in pelletized form in the ratios indicated and extruded as a strip in a single-screw extruder. Visual examinations, TLC measurements of the glass temperature Tg (see Polymer Handbook. 2nd Edition, II, Pages 139 to 141), and measurements of the Vicat softening temperature VET according to DIN 53 460 are made on test plates 3 mm thick from the strip samples that were prepared from the extruded strips on an Anker injection molding machine. Furthermore, a cloud point $T_{Tr}$ was determined on a Kofler heating bank (Chem.-Ing.-Techn. 1950, p. 289), which characterizes the temperature at which the mixture shows a phase transition from homogeneous to heterogeneous with rising temperature (LCST) and is dependent on the composition. LCST or "Lower Critical Solution Temperature" is discussed in D. R. Paul Polymer Blends and Mixtures, 1985, Pages 1-3, Martinus Nijhoff Publishers, Dordrecht/Boston/Lancester.

TABLE 1

| Example No. | Makrolon/copolymer (parts by weight) | Appearance of the Extrudate | Tg (°C.) | VET (°C.) | $T_{Tr} \pm 15$ (°C.) |
| --- | --- | --- | --- | --- | --- |
| 7 | 90/10 | Clear, colorless | 134 | — | 207 |
| 8 | 70/30 | Clear, colorless | 133 | — | 191 |
| 9 | 50/50 | Clear, colorless | 133 | 135 | 209 |
| 10 | 30/70 | Clear, colorless | 133 | — | 243 |
| 11 | 10/90 | Clear, light yellowish | 134 | — | >260 |
| Comparison | Makrolon 1189 | Clear, colorless | 138 | 138 | |
| Comparison | Copolymer | Clear, light yellowish | 140 | 142 | |

Dashes in the measured data in the table and the tables below means that no measurements were made.

Examples 12-16

Makrolon® 1189 and the copolymer prepared according to Example 3 were again mixed as pellets in the quantities indicated, extruded, and tested for Tg and $T_{Tr}$ as in Examples 7-11.

TABLE 2

| Example No. | Makrolon/copolymer (parts by weight) | Appearance of the Extrudate | Tg (°C.) | $T_{Tr} \pm 15$ (°C.) |
| --- | --- | --- | --- | --- |
| 12 | 90/10 | Clear, colorless | — | 205 |
| 13 | 70/30 | Slightly cloudy, colorless | — | 185 |
| 14 | 50/50 | Slightly cloudy, colorless | 129 | 187 |
| 15 | 30/70 | Slightly cloudy, colorless | — | 231 |
| 16 | 10/90 | Clear, colorless | — | >260 |
| Comparison | Copolymer | Clear, colorless | 130 | |

Examples 17-21

Makrolon® 1189 and the copolymer prepared according to Example 4 were mixed in pellet form and in the ratios indicated, extruded, and tested for Tg and $T_{Tr}$ as in Examples 7-11.

TABLE 3

| Example No. | Makrolon/copolymer (parts by weight) | Appearance of the Extrudate | Tg (°C.) | $T_{Tr} \pm 15$ (°C.) |
| --- | --- | --- | --- | --- |
| 17 | 90/10 | Clear, colorless | — | 201 |
| 18 | 70/30 | Slightly cloudy, colorless | — | 191 |
| 19 | 50/50 | Slightly cloudy, yellowish | 136 | 199 |
| 20 | 30/70 | Clear, yellowish | — | 230 |
| 21 | 10/90 | Clear, yellowish | — | >260 |
| Comparison | Copolymer | Clear, yellowish | 141 | — |

Examples 22-31

Makrolon® 1189 and the copolymers prepared according to Examples 5 and 6 were mixed in the indicated ratios, extruded, and tested for the cloud point $T_{Tr}$ according to the Example 7-11.

TABLE 4

| Example No. | Makrolon/copolymer from Example 5 with MA (parts by weight) | Appearance of the Extrudate | VET (°C.) | $T_{Tr} \pm 15$ (°C.) |
| --- | --- | --- | --- | --- |
| 22 | 90/10 | Clear, colorless | — | 189 |
| 23 | 70/30 | Slightly cloudy, colorless | — | 182 |
| 24 | 50/50 | Slightly cloudy, colorless | 135 | 185 |
| 25 | 30/70 | Clear, colorless | — | 192 |
| 26 | 10/90 | Clear, light yellowish | — | 198 |

TABLE 5

| Example No. | Makrolon/copolymer from Example 6 with CHA (parts by weight) | Appearance of the Extrudate | VET (°C.) | $T_{Tr} \pm 15$ (°C.) |
| --- | --- | --- | --- | --- |
| 27 | 90/10 | Clear, colorless | — | 205 |
| 28 | 70/30 | Clear, colorless | — | 192 |
| 29 | 50/50 | Slightly cloudy, colorless | 134 | 206 |
| 30 | 30/70 | Clear, colorless | — | 240 |
| 31 | 10/90 | Clear, light yellowish | — | >260 |

Examples 32-36:

Makrolon® 1189 and the copolymer prepared according to Example 1 were mixed in the indicated ratios, extruded, and tested for the cloud point $T_{Tr}$ according to Examples 7-11.

TABLE 6

| Example No. | Makrolon/ copolymer from Example 1 (parts by weight) | Appearance of the Extrudate | Tg (°C.) | $T_{Tr} \pm 15$ (°C.) |
| --- | --- | --- | --- | --- |
| 32 | 90/10 | Clear, colorless | — | 230 |
| 33 | 70/30 | Slightly cloudy, colorless | — | 214 |
| 34 | 50/50 | Slightly cloudy, colorless | 125 | 222 |
| 35 | 30/70 | Clear, light yellowish | — | 232 |
| 36 | 10/90 | Clear, light yellowish | — | >260 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermoplastic transparent polymer mixture, comprising: (a) an aromatic poolycarbonate and (b) a methacrylate copolymer, wherein said copolymer comprises:
   (i) 40–95 wt.% methyl methacrylate, and
   (ii) 5–40 wt.% maleimide monomers having formula

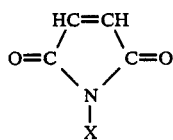

wherein X is an unsubstituted cyclohexyl group or a monosubstituted or polysubstituted cyclohexyl group, substituted with at least one substituent selected from the group consisting of $C_{1-6}$ alkyl groups, and wherein said copolymer has a molecular weight $M_w$ greater than 30,000.

2. The transparent polymer mixture of claim 1, wherein X is a cyclohexyl group.

3. The transparent polymer mixture of claim 1, wherein X is a methyl-substituted cyclohexy group.

4. The transparent polymer mixture of claim 1, wherein said polycarbonate (A) is the polycarbonate of 2,2-bis(4-hydroxyphenyl)propane.

5. A thermoplastic transparent polymer mixture, consisting essentially of: (a) an aromatic polycarbonate and (b) a methacrylate copolymer, wherein said copolymer comprises:
   (i) 40–95 wt.% methylmethacrylate, and
   (ii) 5–40 wt.% maleimide monomers having formula

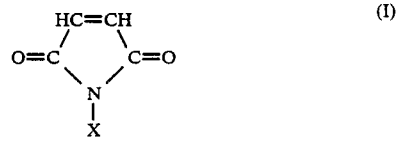

wherein X is an unsubstituted cyclohexy group or a monosubstituted or polysubstituted cyclohexyl group, substituted with at least one substituent selected from the group consisting of $C_{1-6}$ alkyl groups, and wherein said copolymer has a molecular weight $M_w$ greater than 30,000.

6. The transparent polymer mixture of claim 5, wherein X is a cyclohexy group.

7. THe transparent polymer mixture of claim 5, wherein X is a methyl-substituted cyclohexy group.

8. The transparent polymer mixture of claim 5, wherein said polycarbonate (a) is the polycarbonate of 2,2-bis(4-hydroxyphenyl)propane.

* * * * *